(12) United States Patent
Zollinger (10) Patent No.: US 12,461,088 B2
(45) Date of Patent: Nov. 4, 2025

(54) MONITORING OF CONCRETE CURING

(71) Applicant: Intellitronx Robotics and Data Analytics Corp., Starke, FL (US)

(72) Inventor: Dan Glen Zollinger, Bryan, TX (US)

(73) Assignee: Intellitronx Robotics and Data Analytics Corp., Starke, FL (US)

( * ) Notice: Subject to any disclaimer, the term of this patent is extended or adjusted under 35 U.S.C. 154(b) by 546 days.

(21) Appl. No.: 17/722,295

(22) Filed: Apr. 15, 2022

(65) Prior Publication Data
US 2022/0334096 A1     Oct. 20, 2022

Related U.S. Application Data (60) Provisional application No. 63/258,152, filed on Apr. 15, 2021.

(51) Int. Cl.
| | | |
|---|---|---|
| *G01N 33/38* | (2006.01) | |
| *G01N 1/12* | (2006.01) | |
| *G01N 1/14* | (2006.01) | |
| *G01N 25/66* | (2006.01) | |

(52) U.S. Cl.
CPC ............ *G01N 33/383* (2013.01); *G01N 1/12* (2013.01); *G01N 1/14* (2013.01); *G01N 25/66* (2013.01)

(58) Field of Classification Search
CPC ........ G01N 33/383; G01N 1/14; G01N 25/66; G01N 1/12
USPC .......................................................... 73/713
See application file for complete search history.

(56) References Cited

U.S. PATENT DOCUMENTS

| | | | | |
|---|---|---|---|---|
| 11,408,816 B2 * | 8/2022 | Zhang | .................. | G01N 17/002 |
| 2007/0065071 A1 * | 3/2007 | Slade | .................. | G01D 5/35303 |
| | | | | 385/12 |

FOREIGN PATENT DOCUMENTS

| | | | | | |
|---|---|---|---|---|---|
| CN | 104965063 | A | * | 10/2015 | |
| CN | 207263711 | U | * | 4/2018 | |
| CN | 111596043 | A | * | 8/2020 | ........... G01D 11/245 |
| CN | 214953193 | U | * | 11/2021 | |
| ES | 2671948 | T3 | * | 6/2018 | ........... B28B 11/245 |
| JP | 2001013013 | A | * | 1/2001 | |
| JP | 2009144321 | A | * | 7/2009 | |
| KR | 101125785 | B1 | * | 3/2012 | |

OTHER PUBLICATIONS

Translation KR_101125785 Mar. 27, 2012 (Year: 2012).*
Translation _CN_207263711 Apr. 20, 2018 (Year: 2018).*
ES_2671948 Jun. 11, 2018 (Year: 2018).*
JP_2009144321 Jul. 2, 2009 (Year: 2009).*
Translation__CN214953193 Nov. 30, 2021 (Year: 2021).*

* cited by examiner

*Primary Examiner* — Peter J Macchiarolo
*Assistant Examiner* — Monica S Young
(74) *Attorney, Agent, or Firm* — DENTONS Durham Jones Pinegar (57) ABSTRACT

Apparatuses, systems, and methods for monitoring the curing of concrete employ a vacuum to draw a moisture sample from concrete (e.g., curing concrete, etc.) into the presence of a single dew point temperature (DPT) sensor. Moisture samples may be selectively drawn into the presence of the DPT sensor from sampling chambers within the concrete at a variety of locations across the concrete and/or from a variety of depths within the concrete. The dew point temperature data may be used to determine the quality of a concrete curing process.

20 Claims, 4 Drawing Sheets

MONITORING OF CONCRETE CURING

CROSS-REFERENCE TO RELATED APPLICATION

A claim for the benefit of the Apr. 15, 2021 filing date of U.S. Provisional Patent Application No. 63/258,152, titled PERFORMANCE ENGINEERED CONCRETE CURING PROCESS ("the '152 Provisional Application") is hereby made pursuant to 35 U.S.C. § 119(e). The entire disclosure of the '152 Provisional Application is hereby incorporated herein.

TECHNICAL FIELD

This disclosure relates generally to apparatuses, systems, and methods for monitoring the curing of concrete and, more specifically, to apparatuses, systems, and methods for monitoring humidity at one or more depths within concrete and, optionally, monitoring other conditions associated with the curing concrete to provide an indicator of the effectiveness of the curing process. Monitoring the curing of concrete in accordance with this disclosure may enable real-time adjustment to curing conditions and, thus, optimization of the curing process, to improve the effectiveness of the curing process; thus, this disclosure also relates to apparatuses, systems, and methods for curing concrete.

RELATED ART

The curing of concrete can be a temperamental process. If curing conditions, including the temperature and water content of the concrete, are not correct during the early curing period, or for the first few days (e.g., three days, seven days, etc.) of the curing process, hydration of the concrete (i.e., the reaction between water and cement in the concrete) may be adversely affected, which may prevent the concrete from setting and hardening properly and, thus, negatively affect the durability of the concrete. Atmospheric changes (i.e., changes in the weather) may adversely affect hydration and, thus, the quality of the curing concrete. A variety of so-called failures can result from improper hydration, including cracking, spalling, curling, and loss of strength.

Evaluations of the effectiveness of concrete curing are typically conducted in the laboratory using ASTM C 156 (Water Retention by Concrete Curing Materials). The deficiencies of evaluating concrete curing processes in this manner include: (1) test conditions hold little relevance to field conditions; (2) laboratory measurements are often not useful or transferable to the environments in which concrete is cured; and (3) they provide a questionable basis for moisture loss limits and have limited relevance to the short-term and long-term performance of the concrete.

Conventionally, a variety of techniques have been used to prevent failures from occurring as concrete cures. These include passive controls, such as the use of membranes or curing compounds over the surface of curing concrete, the inclusion of shrinkage additives or concrete reinforcing fibers in the concrete mixture, and saw cutting the concrete. The effectiveness of passive controls is still subject to atmospheric conditions (i.e., the weather) and changes therein. Moreover, the use of passive controls does not provide information that may be useful in compensating for changes in atmospheric conditions or the effects such changes may have on hydration of the curing concrete.

Figure 1:
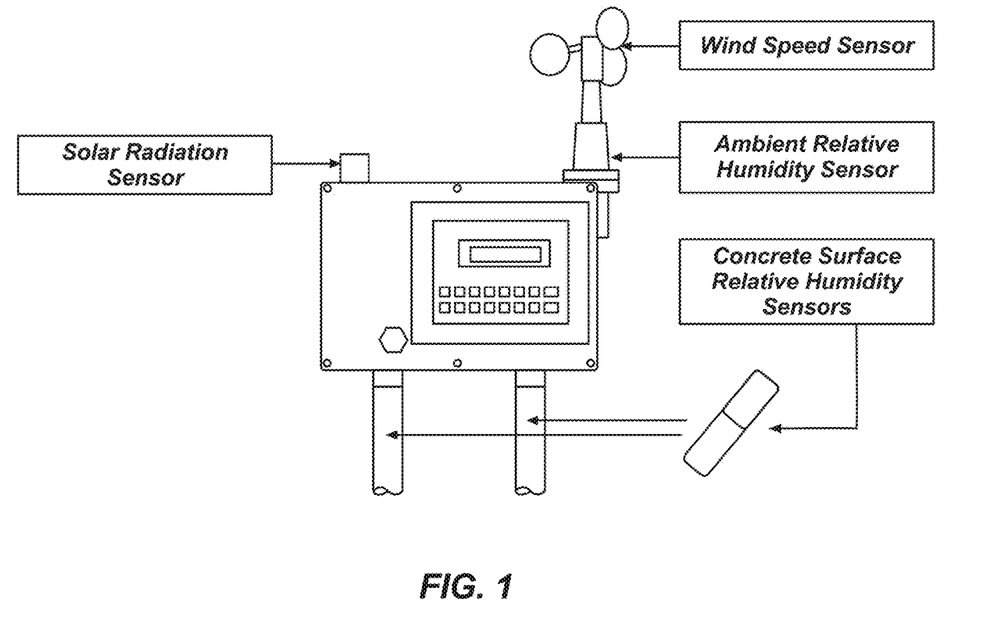
FIG. 1 illustrates an existing active control device for measuring the temperature and humidity of curing concrete in real time.

Active controls have the potential to prevent failures from occurring as concrete cures by providing data during curing that may lead to real-time adjustments to the curing process. FIG. 1 depicts an example of another existing active control device, which is known as a concrete curing maturity meter. The concrete curing maturity meters measures the dry bulb temperature and dew point temperature of the concrete, from which relative humidity is calculated, as well as the temperature (e.g., dry bulb temperature, etc.), relative humidity, wind speed, and solar radiation of the environment in which the curing concrete is located. The concrete curing maturity meter positions a pair of chilled mirror dew point temperature (DPT) sensors, or chilled mirror hygrometers, within the curing concrete to monitor its dry bulb temperature and dew point temperature. One of the chilled mirror hygrometers measures the dry bulb temperature and dew point temperature slightly below the surface of the curing concrete, while the other chilled mirror hygrometer provides the same temperatures from deeper within the curing concrete.

SUMMARY

Apparatuses, systems, and methods for monitoring the curing of concrete are disclosed. Such an apparatus, system, or method may provide accurate, real-time information about conditions within the curing concrete. Such information may be used to adjust the concrete curing process, which may improve the overall quality of the concrete.

Among other things, an apparatus for monitoring the curing of concrete in accordance with this disclosure may comprise a humidity monitor. The humidity monitor may include a vacuum pump that draws moisture samples from curing concrete into a sampling tank, as well as a dew point temperature (DPT) sensor in communication with the sampling tank. The humidity monitor may include only one (i.e., a single) DPT sensor. In addition, the humidity monitor may include a processing element that controls operation of the vacuum pump, the DPT sensor, and other apparatuses that are used with the humidity monitor, as well as a display that shows data obtained and/or processed by the processing element and memory associated with the processing element.

The humidity monitor may collect moisture samples from within the curing concrete by way of sampling system. Together, the humidity monitor and the sampling system may comprise a humidity monitoring system. The sampling system may include sampling chambers that may be positioned in the surface of the concrete while it is fresh and remain in the concrete as it cures. The sampling system may include a single sampling chamber or a plurality of sampling chambers. In embodiments where the sampling system includes a plurality of sampling chambers, the sampling chambers may be positioned at different locations of the curing concrete and/or at different depths within the curing concrete.

Each sampling chamber may have a tubular structure defined by at least one sidewall. The sidewall may include one or more apertures that expose an interior of the sampling chamber to the concrete that surrounds the sampling chamber and, thus, enable moisture from the concrete to be communicated into the interior of the sampling chamber. The tubular structure may also have a bottom end and a top end. The bottom end of the tubular structure may be closed. A configuration of the bottom end may facilitate its insertion into fresh concrete; for example, the bottom end may have a rounded or tapered shape. The top end of the tubular structure may be open. An opening in the top end may be provided with a seal (e.g., similar to an inflation valve for a sport ball, etc.) that may receive an insertion element of the sampling system (e.g., a conduit, such as a hollow needle, etc.) and reseal upon removal of the insertion element therefrom.

Each sampling chamber may have a lateral dimension (e.g., a diameter, etc.) that enables it to remain in place within the concrete after the concrete has cured. The sampling chamber may have any of a variety of lengths.

In addition to one or more sampling chambers, the sampling system may include a valve (e.g., a solenoid valve, etc.) and sample conduit that corresponds to each sampling chamber. Each valve may operate under control of the processing element. Thus, the processing element of the humidity monitor may select the sampling chamber and, thus, the corresponding location of the concrete, from which a moisture sample is obtained. The sample conduit extends from the valve to the humidity monitor. A manifold may facilitate the connection of a plurality of sample conduits of the sampling system to the sampling tank of the humidity monitor. The manifold may be part of the humidity monitor.

Although the humidity monitor includes only one DPT sensor, the use of a vacuum to drawn a moisture sample into the sampling tank and, thus, into the presence of the DPT sensor enables the humidity monitoring system obtain accurate information regarding the humidity within the location of the concrete from which the moisture sample is obtained.

A method of using such a system may include placing one or more sampling chambers in a surface of fresh concrete. More specifically, the bottom end of each sampling chamber may be inserted into a desired location of the surface of the fresh concrete until the top end of the sampling chamber is substantially flush with the surface. As the fresh concrete sets and cures, a sample conduit may be placed in communication with each sampling chamber. Placement of the sample conduit in communication with the sampling chamber may include placing a valve at a location that provides control over the communication of moisture through the sample conduit (e.g., between the sample conduit and the sampling chamber, etc.). In embodiments where a plurality of sampling chambers have been introduced into the surface, a valve and a sample conduit may be placed in communication with each sampling chamber; thus, a plurality of valves and sample conduits may be placed.

Each sample conduit may be coupled to the humidity monitor in a manner that facilitates communication between each sampling chamber and the sampling tank of the humidity monitor. In embodiments where a plurality of sampling chambers and, thus, a plurality of sample conduits are employed, the sample conduits may be connected to a manifold that communicates with the conduit and sampling tank of the humidity monitor.

A method according to this disclosure may be used with a variety of different materials (e.g., concrete compositions, etc.), with any concrete curing technique, and under a variety of conditions.

With each sample conduit coupled to the humidity monitor, a moisture sample may be obtained from one or more sampling chambers. Moisture sampling may occur by generating a vacuum with the vacuum pump, opening the valve, if any, associated with the sampling chamber from which a moisture sample is to be obtained, and drawing the moisture sample from the sampling chamber, through the valve, if any, through the sample conduit, and into the conduit and sampling tank of the humidity monitor, where the DPT sensor of the humidity monitor is exposed to the moisture sample to measure the dew point temperature of the moisture sample. Information obtained with the DPT sensor may then be output, processed, stored, and/or transmitted (e.g., by the processing element of the humidity monitor, etc.). Further samples may then be obtained from other sampling chambers and, thus, from other locations of the concrete in the same manner.

The information, or data, obtained by the humidity monitor may be used to provide an evaluation index (EI), which may provide an indicator of the quality of the curing process with respect to the permeability and density of the surface concrete. The EI may also providing an indicator of any modification(s) that should be made to the curing process to provide for optimized conditions for then-present atmospheric conditions. For example, a particular EI may correspond to the rate at which moisture and/or curing compounds should be applied to the surface of the curing concrete to improve the quality of the curing process.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 2:
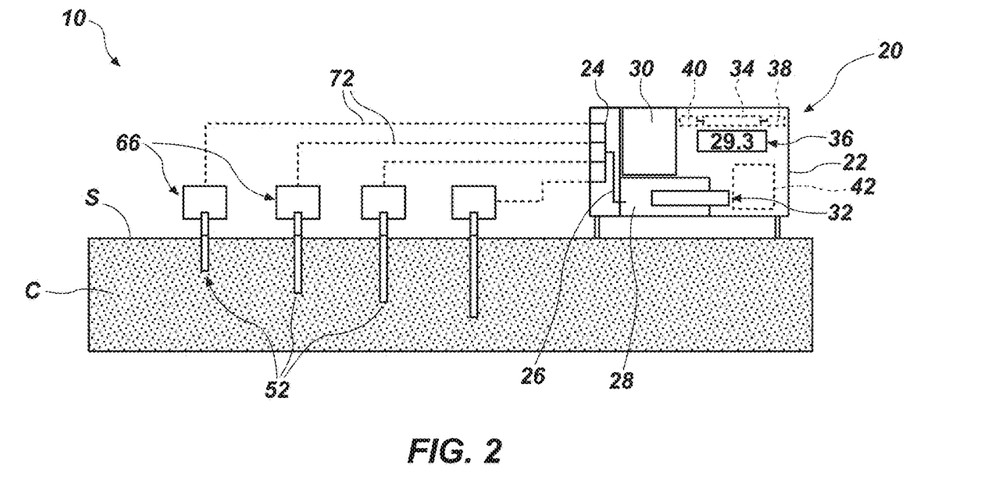
FIG. 2 provides a schematic representation of an embodiment of a humidity monitoring system of this disclosure, which may include a humidity monitor, one or more sampling chambers, and a sampling system that may include valves, sample conduits, and a manifold that convey humidity from each sampling chamber to the humidity monitor.

With reference to FIG. 2, an embodiment of an active control device, which comprises a humidity monitor 20 is depicted. The humidity monitor 20 is part of a humidity monitoring system 10 that also includes a sample collection system 50.

The humidity monitor 20 includes a housing 22 that carries an optional manifold 24, at least one conduit 26, a sampling tank 28, a vacuum pump 30, and a DPT sensor 32. The housing 22 of the humidity monitor 20 may also carry a processing element 34, a display 36, memory 38, and a communication element 40. In addition, the housing 22 of the humidity monitor 20 may carry a power supply 42 that provides power to the vacuum pump 28, DPT sensor 32, processing element 34, display 36, memory 38, and communication element 40. In some embodiments, the humidity monitor 20 may also include components that measure the temperature (e.g., dry bulb temperature, etc.), relative humidity, wind speed, and solar radiation of the environment in which the curing concrete is located.

The housing 22 may impart the humidity monitor 20 with portability. More specifically, the housing 22 may enable the humidity monitor 20 to be carried by an individual and positioned on or adjacent to curing concrete near one or more locations from which moisture samples are to be obtained from the concrete.

The manifold 24, if any, and/or the conduit 26 may including a coupling 25 that enables the manifold 24 and/or conduit 26 to couple to and establish flow communication with one or more sample conduits 72, as described in further detailed hereinafter. Thus, the manifold 24, if any, and the conduit 26 may convey moisture samples from one or more sample conduits 72 into the sampling tank 28. Each coupling 25 may provide for a sealed coupling between the manifold 24 and/or conduit 26 and a corresponding sample conduit 72.

The vacuum pump 30 may apply a vacuum to the sampling tank 28, the conduit 26, and/or the manifold 24, if any, to draw a moisture sample into the sampling tank 28.

The DPT sensor 32 may be positioned in the sampling tank 28. The DPT sensor 32 may comprise a chilled mirror hygrometer, which may be used to provide a measurement of the dew point temperature at a certain location within the concrete. The humidity monitor 20 may include a single DPT sensor 32, as opposed to the multiple DPT sensors employed by existing concrete curing maturity meters.

The processing element 34 may control operation of other components of the humidity monitor 20, such as the vacuum pump 30 and the DPT sensor 32, as well as valve assemblies 66 of the sample collection system 50 and, in embodiments where the humidity monitor 20 includes a manifold 24, any valves associated with the manifold 24. More specifically, the processing element 34 may execute one or more programs, or apps, to control the functions of other components of the humidity monitor 20 and the humidity monitoring system 10 and to process, display, store, and/or transmit data collected by the humidity monitor 20. Accordingly, the processing element 34 may communicate with the display 36, memory 38, and communication element 40. The processing element 34 may comprise any suitable processing element, such as a microprocessor, one or more microcontrollers, or the like. In some embodiments, at least some of the programs executed by the processing element 34 may be embedded into read-only memory (ROM) of the processing element 34 (e.g., as firmware, etc.) or associated with the processing element 34.

The display 36 may comprise any suitable display that provides a visual output of data obtained with the DPT sensor 32 and, optionally, derivative data generated by the processing element 34. In various embodiments, the display 36 may comprise a liquid crystal display (LCD).

The memory 38 may receive data from the processing element 34 and store the data in accordance with instructions from the processing element 34. In some embodiments, the memory 38 may store one or more of the programs that are to be executed by the processing element 34. The memory 38 may comprise standard computer memory (e.g., flash memory, etc.), such as a solid state drive (SSD) or an external thumb (e.g., a USB, or universal serial bus) memory device (i.e., a so-called thumb drive, etc.).

The communication element 40, which may also operate under control of the processing element 34, may communicate data to devices that are external to the humidity monitor 20. Without limitation, the communication element 40 may communicate data to an external computing device 44, such as a smart phone, a tablet computer, a laptop computer, or any other type of computing device that may be used to display and/or use (e.g., further process, control the operation of other devices, etc.) the data obtained with and/or generated by the humidity monitor 20. The communication element 40 may include one or more communications ports (e.g., a USB-3 port, a USB port, etc.) and/or one or more wireless communication devices (e.g., a Wi-Fi transceiver and antenna, a Bluetooth transceiver and antenna, a near field communication (NFC) transceiver and antenna, etc.).

The power supply 42 of the humidity monitor 20 may supply power to other components of the humidity monitor 20 and, optionally, to components of the sample collection system 50. Without limitation, the power supply 42 may supply power to the vacuum pump 30, the DPT sensor 32, the processing element 34, the display 36, the memory 38, and the communication element 40. The power supply 42 may also supply power to the valve assemblies 66 of the sample collection system 50. The power supply 42 may be connectable to mains power, or the electrical grid. In some embodiments, due to the portability of the humidity monitor 20 and its potential for use in a variety of environments, the power supply 42 may include a battery.

With continued reference to FIG. 2, the sample collection system 50 of the humidity monitoring system 10 may include one or more sampling chambers 52, a valve assembly 66 that corresponds to each sampling chamber 52, and a sample conduit 72 coupled to each valve assembly 66.

Figure 3:
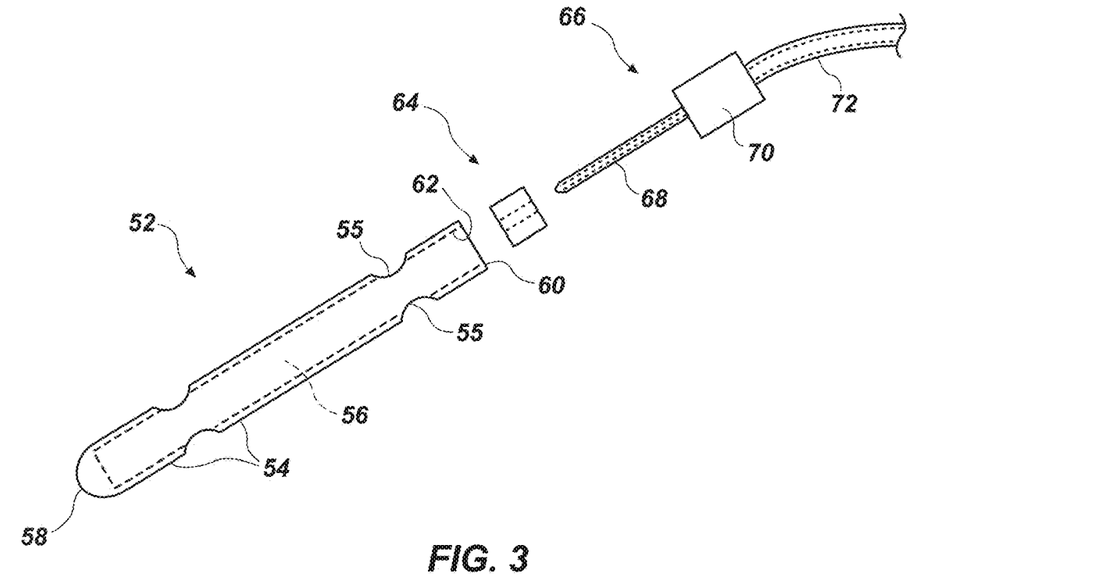
FIG. 3 depicts embodiments of a sampling chamber and a valve that may be used with the embodiment of the humidity monitor shown in FIG. 2 to collect information on the humidity of curing concrete from within the curing concrete.

As shown in FIG. 3, each sampling chamber 52 may be generally tubular. Thus, the sampling chamber 52 may include a sidewall 54 that defines a lumen 56, or an interior of the sampling chamber 52, and one or more apertures 55. For example, there are four (4) apertures 55 in the depicted embodiment, although a sampling chamber 52 may include fewer apertures 55 or more apertures 55, apertures 55 of different shapes, and/or apertures 55 of different sizes than those illustrated by FIG. 3. Each aperture 55 may be provided through the sidewall 54 to enable moisture to be communicated from concrete within which the sampling chamber 52 is placed to the lumen 56 of the sampling chamber 52.

Each sampling chamber 52 may have a lateral dimension (e.g., a diameter, etc.) that enables it to remain in place within the concrete after the concrete has cured. Without limitation, the lateral dimension of each sampling chamber may be about a half an inch (1.25 cm) or less (e.g., about ⅜ inch (about 0.95 cm), about 0.25 inch (about 0.64 cm), etc.). The sampling chamber 52 may have any of a variety of lengths. Without limitation, the sampling chamber 52 may be at least about 3 inches (about 7.6 cm) long (e.g., about 3.5 inches (about 8.9 cm) long, about 4 inches (about 10.2 cm) long, about 4.5 inches (about 11.4 cm) long, about 5 inches long (about 12.7 cm) long, about 5.5 inches long (about 14 cm) long, about 6 inches long (about 15.2 cm) long, etc.).

The sampling chamber 52 may also include a bottom end 58 and a top end 60. The bottom end 58 of the sampling chamber 52 may be closed. A configuration of the bottom end 58 may facilitate its insertion into fresh concrete; for example, the bottom end 58 may have a rounded shape or tapered shape, as depicted. The top end 60 of the sampling chamber 52 may be open. An opening 62 in the top end 60 may have a configuration that enables it to receive a seal 64.

The seal 64 may cover the opening 62 in the top end 60 of the sampling chamber 52. Thus, the seal 64 may prevent matter from being unintentionally introduced into the lumen 56 of the sampling chamber 52; for example, the seal 64 may prevent exterior moisture, dirt, debris, and other items from falling into the lumen 56 of the sampling chamber 52. In addition, the seal 64 may provide for selective access to the lumen 56 of the sampling chamber 52. For example, the seal 64 may comprise a resalable valve (e.g., similar to an inflation valve for a sport ball, etc.) that enables the valve assembly 66 to establish communication with the lumen 56 of the sampling chamber 52 while providing for an airtight connection that enables moisture from within the lumen 56 to be communicated through the valve assembly 66 and its associated sample conduit 72 to the manifold 24, if any, the conduit 26, and the sampling tank 28 of the humidity monitor 20.

The valve assembly 66, which is an optional component of the sampling system 50, may comprise any suitable valve 70 that opens to provide flow communication between the lumen 56 of the sampling chamber 52 and the sample conduit 72 and provides an airtight seal when closed. In some embodiments, the valve 70 of the valve assembly 66 may include an actuator (e.g., a solenoid, etc.); the actuator may function under control of the processing element 34 of the humidity monitor 20 (FIG. 2).

As illustrated, the valve assembly 66 may also include an insertion element 68 (e.g., a conduit, such as a hollow needle, etc.) that may be introduced through the seal 64 to establish communication between the lumen 56 of the sampling chamber 52 and the sample conduit 72 that has been coupled to the valve assembly 66.

Each sample conduit 72 establishes communication between the valve assembly 66 and the humidity monitor 20. More specifically, in embodiments where a manifold 24 is included to enable the humidity monitor 20 to selectively obtain and analyze moisture samples from a plurality of sampling chambers 52, each sample conduit 72 may be coupled in a sealed, or airtight, manner to the manifold 24. Alternatively, each sample conduit 72 may be coupled to the conduit 26 of the humidity monitor 20 in a sealed, or airtight, manner.

Each sampling chamber 52, valve assembly 66, and sample conduits 72 may be constructed in a manner and from materials that will maintain their shapes and integrities when the vacuum pump 30 of the humidity monitor 20 (FIG. 1) applies a vacuum to each of them. In addition, the material from which each sampling chamber 52 is made may enable the sampling chamber 52 to remain intact while the concrete it has been introduced into cures. In embodiments where the sampling chambers 52 are intended to remain permanently in place within the concrete, each sampling chamber 52 may be made from a corrosion-resistant material, which may retain its integrity over time (e.g., months, years, etc.) when subjected to the environment within which the concrete has been placed. As a few examples, the sampling chambers 52 may be made from a copper alloy (e.g., brass, etc.), stainless steel, or the like, while the sample conduits 72 may be made from suitable plastic tubing, copper tubing, copper alloy tubing, stainless steel tubing, or the like.

Figure 4:
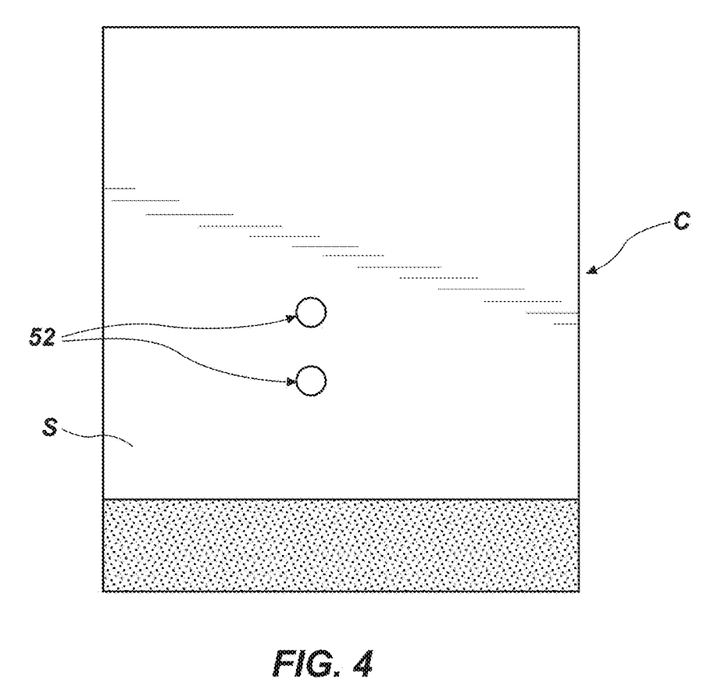
FIG. 4 shows an embodiment of placement of sampling chambers, such as those depicted by FIG. 3, in the surface of fresh concrete.

With added reference to FIG. 4, a method of monitoring concrete C as it cures includes placing one or more sampling chambers 52 in a surface S of the concrete C. Each sampling chamber 52 may be placed while the concrete C is wet or fresh, while finishing the surface S or shortly after finishing the surface S. The placement of each sampling chamber 52 may include placing the bottom end 58 of the sampling chamber 52 against the surface S of the concrete C at a location where the sampling chamber 52 is to be positioned and pushing the sampling chamber 52 into the surface S until the top end 60 of the sampling chamber 52 is substantially flush with the surface S. Fresh concrete C may be prevented from entering into the lumen 56 of the sampling chamber 52 through the apertures 55 as the sampling chamber 52 is placed within the concrete C (e.g., by blocking the apertures 55, etc.). Any fresh concrete that enters the lumen 56 during placement of the sampling chamber 52 may be removed from the lumen 56 once the sampling chamber 52 has been properly positioned within the concrete C.

A single sampling chamber 52 may be placed in the concrete C or a plurality of sampling chambers 52 may be placed in the concrete C. In embodiments where a plurality of sampling chambers 52 are placed in the concrete C, the sampling chambers 52 may be placed at different locations over the surface S of the concrete C, at a plurality of depths into the concrete C, or at a combination of different locations and different depths.

A seal 64 may be placed within the opening 62 of the top end 60 of each sampling chamber 52. Placement of the seal 64 may occur shortly after the sampling chamber 52 is placed within the concrete C. Alternatively, the seal 64 may be placed as soon as the concrete C has set enough to limit movement of the sampling chamber 52 within the concrete C.

As shown in FIG. 2, with the seal 64 in place, a sample conduit 72 may be placed in flow communication between each sampling chamber 52 and the humidity monitor 20. The placement of each sample conduit 72 may include coupling a valve assembly 66 to each sampling chamber 52 (e.g., to the seal 64 thereof, etc.), coupling a first end of the sample conduit 72 to the valve assembly 66, and coupling a second end of the sample conduit 72 to the manifold 24 or to the conduit 26 of the humidity monitor 20.

Once flow communication has been established between each sampling chamber 52 and the humidity monitor 20, the humidity monitor 20 may be used to obtain and analyze a moisture sample from each sampling chamber 52. The humidity monitor 20 may be used to obtain and analyze a moisture sample from a single sampling chamber 52 or the humidity monitor 20 may selectively obtain and analyze moisture samples from a plurality of sampling chambers 52.

Moisture sampling may occur by generating a vacuum with the vacuum pump 30 of the humidity monitor 20, opening the valve assembly 66, if any, associated with the sampling chamber 52 from which a moisture sample is to be obtained, and drawing the moisture sample from the sampling chamber 52, through the valve assembly 66, if any, through the sample conduit 72, and into the sampling tank 28 of the humidity monitor 20, where the DPT sensor 32 of the humidity monitor 20 is exposed to the moisture sample. Information obtained with the DPT sensor 32 may then be output, processed, stored, and/or transmitted (e.g., by the processing element 34 of the humidity monitor 20, etc.). Further samples may then be selectively obtained from other sampling chambers 52 and, thus, from other locations of the concrete C in the same manner.

A humidity monitoring method of this disclosure may be used in a variety of settings, including in the laboratory (e.g., to evaluate curing of concrete mixtures (e.g., more environmentally friendly cement-based concretes, etc.), the effects of various conditions on the curing of concrete, the viability of new concrete curing aids or techniques, etc.) or in the field (e.g., on formed construction, etc.). The method is applicable to flatwork, such as flooring, pavement, and bridges, and can be adapted to vertical work or to concrete used in any other application. The humidity monitor 20 may be used manually for smaller jobs or mounted to either robotic equipment or paving equipment in larger concrete pours. In addition to being useful for monitoring concrete as it cures, the method may be used with hardened concrete for forensic purposes. The humidity monitoring system 10 has the ability to cover large surface areas with minimal intrusion.

Data may be obtained and/or generated by the humidity monitor 20 at different times throughout the curing process and even thereafter. The data obtained and/or generated by the humidity monitor 20 may be used to determine the quality of the curing process with respect to the permeability and density of the surface S of the concrete C, as well as the quality of the concrete C after the concrete C has cured. For example, the data may be used (alone or with other data) to provide an evaluation index (EI) that characterizes the effectiveness over time of any curing system for hardening or hardened concrete.

An EI may be determined at a particular point in time as concrete cures. EI may be determined using the following equation:

$$EI = \frac{t_f - t_a}{t_s - t_a},$$

where:
  $t_f$ is the equivalent age of the filtered curing condition;
  $t_s$ is the equivalent age of the sealed curing condition;
  $t_a$ is the equivalent age of the ambient curing condition; and $$t_k = \sum_0^i \frac{T(t)_k - T_0(t)}{T_{rm} - T_0(t)} \cdot \Delta t_i = \sum_0^i e^{-Q\left(\frac{1}{T_k(t)} - \frac{1}{T_0(t)}\right)} \cdot \Delta t_i,$$

where:
  $T_k$ is the concrete temperature at a specific depth or position;
  $T_0$ is the dew point temperature at 80% relative humidity (rh) at Tk;
  $T_{rm}$ is the dew point temperature at 99% rh at Tk; and $Q = E_a/R$, where:
  $E_a$ is the activation energy for hydration;
  R is the universal gas constant (e.g., 8.31446261815324 J×K$^{-1}$×mol$^{-1}$); and
  $T_i$ is time.

The scaling factor ($\beta$) has traditionally been determined using a modified Nurse-Saul formula:

$$M = \beta_h \cdot \sum_0^i \left(\frac{T_k(t) - T_0}{T_{rm} - T_0}\right) \cdot \Delta t = \frac{\sum_0^i \left(\frac{T_k(t) - T_0}{T_{rm} - T_0}\right) \cdot \Delta time}{1 + (5 - 5rh)}$$

$$\beta_h = \frac{1}{1 + (5 - 5rh)}$$

or a modified Arrhenius formula:

$$M = \beta_h \cdot \sum_0^t e^{-\frac{E}{R}\left(\frac{1}{T_k(t)} - \frac{1}{T_R}\right)} \cdot \Delta t = \frac{\sum_0^t e^{-\frac{E}{R}\left(\frac{1}{T_k(t)} - \frac{1}{T_R}\right)} \cdot \Delta time}{1 + (5 - 5h)}$$

$$T_k = \beta_h \cdot \sum e^{Q\left(\frac{1}{T_k(t)} - \frac{1}{T_R}\right)} \cdot \Delta t; \; T_k = \int \beta_h \beta_T dt; \; \beta_T = e^{\frac{E}{R}\left(\frac{1}{T_k(t)} - \frac{1}{T_R}\right)}$$

where:
  h and rh are the relative humidity;
  $T_r$ is a reference temperature (typically room temperature); and
  $T_0$ is the minimum dry bulb temperature below which hydration cease.

However, the humidity monitoring system 10 employs dew point temperature data rather than minimum dry bulb temperature data.

The data obtained with the humidity monitoring system 10 and any ancillary equipment may be used to calibrate any parameter derived from the use, characterization, or employment (automated or manually executed) of non-destructive testing (NDT) data and its trend with time as a means to extend the EI obtained with the humidity monitoring system 10 or a parameter related to EI obtained with the humidity monitoring system 10 to any other location on a surface S of either fresh or hardened concrete C over time. An example of NDT data is the use of ground penetrating radar (GPR) to measure the surface dielectric ($\xi$) of a concrete surface which can be modeled as a function time (t):

$$\bar{\varepsilon}_r = \tau\left[1 - e^{-\left(\frac{t}{\beta}\right)^\alpha}\right]$$

where:
  $\varepsilon_r$ is the average value of dielectric constant;
  t is the elapsed time in hours;
  $\tau$ is the amplifying parameter;
  $\beta$ is the scaling factor that depends on the decreasing rate; and
  $\alpha$ is the shift parameter.

Figure 5:
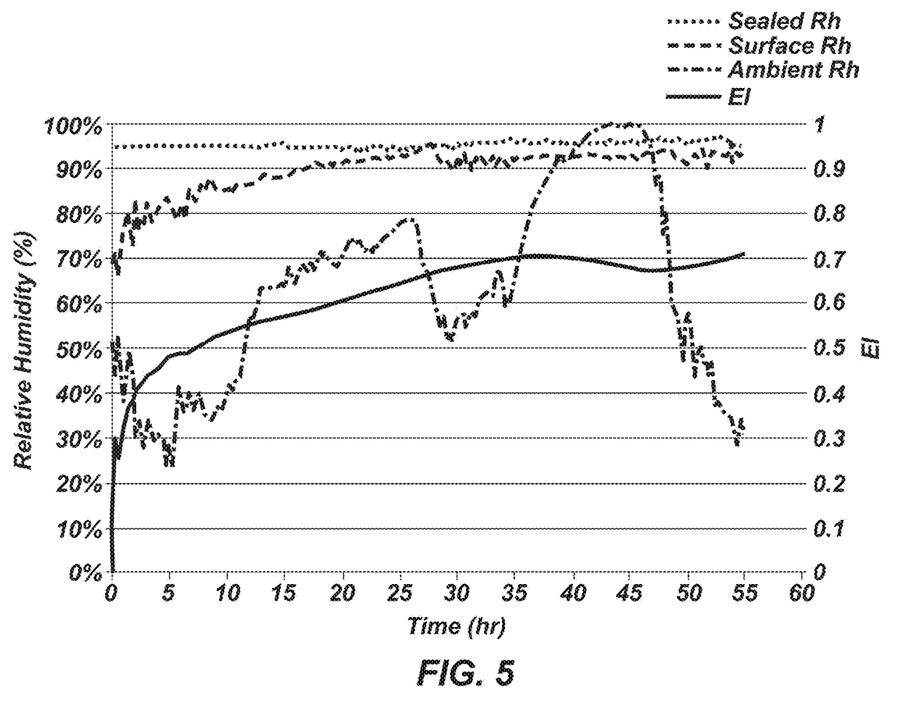
FIG. 5 is a graph illustrating humidity data that may be collected with the embodiment of humidity monitoring system depicted by FIG. 2 and the EI that may be calculated using such data.

FIG. 5 is a graph illustrating humidity data that may be collected with the embodiment of humidity monitoring system 10 depicted by FIG. 2 and the EI that may be calculated using such data.

Figure 6:
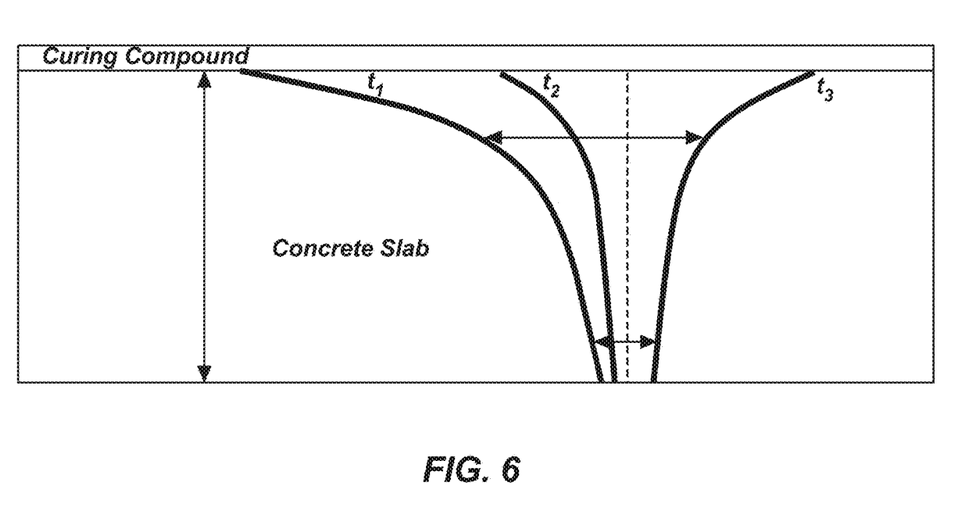
FIG. 6 provides a representation of moisture and temperature gradients that may develop within curing concrete.

FIG. 6 is a representation of moisture and temperature gradients that may develop within a slab of concrete C as it cures.

Figure 7:
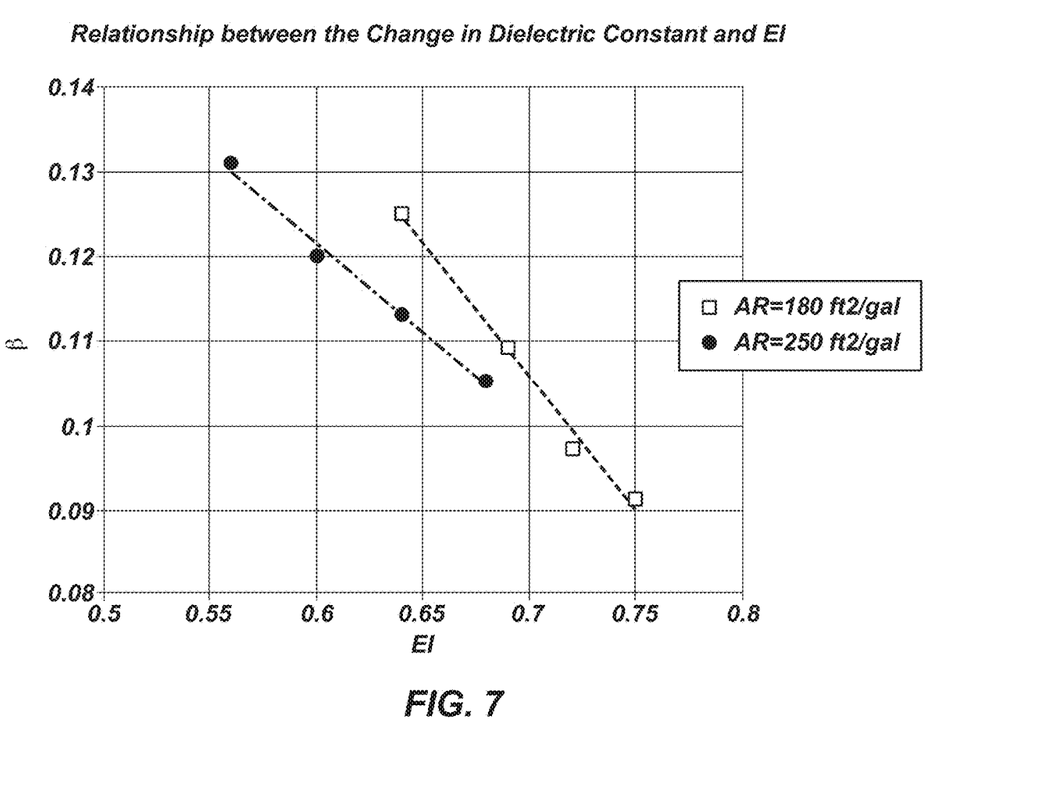
FIG. 7 is a graph showing examples of the relationship between the dielectric constant of curing concrete and the EI for different curing processes using different curing compound application rates (AR).

FIG. 7 shows the correlation of the scaling factor ($\beta$) to EI, but the correlation could also be done using the shift parameter ($\alpha$) or the amplifying parameter ($\tau$).

The EI may serve as a bridge to field performance by relating concrete surface quality to curing effectiveness and placement conditions. The EI will be instrumental in the real-time management of different application rates (e.g., of curing compounds, or moisture, etc.) and of other process parameters, providing a means to guide curing practice and make adjustments on the go based on the ambient field conditions and the type of curing system.

The apparatuses, systems, and methods of this disclosure enable the accurate evaluation of concrete curing processes in real-time while minimizing invasion of the concrete. Additionally, the apparatuses, systems, and methods of this disclosure may facilitate optimization of concrete curing processes by providing information that may enable adjustments just in time to the curing regimen to obtain optimized conditions for the atmospheric conditions present at the time.

Although the preceding disclosure provides many specifics, these should not be construed as limiting the scope of any of the claims that follow, but merely as providing illustrations of some embodiments of elements and features of the disclosed subject matter. Other embodiments of the disclosed subject matter may be devised which do not depart from the spirit or scope of any of the claims. Features from different embodiments may be employed in combination. Accordingly, the scope of each claim is limited only by its plain language and the legal equivalents thereto.

What is claimed:

1. A humidity monitor for use with concrete while curing of the concrete, comprising:
    a housing defining an exterior and an interior of the humidity monitor;
    a conduit that receives a moisture sample from outside the humidity monitor;
    a sampling tank within the interior of the housing and in communication with the conduit;
    a vacuum pump within the interior of the housing that applies a vacuum to at least one of the conduit and the sampling tank;
    a dew point temperature sensor within the housing and in communication with the sampling tank; and
    at least one sampling chamber positionable remotely from the housing and including:
        an outer wall defining a bottom, sides, and a top of the at least one sampling chamber, the outer wall defining an exterior surface positionable against curing concrete and an interior surface defining an interior of the at least one sampling chamber, the bottom having a rounded or tapered shape that facilitates insertion of the at least one sampling chamber into wet or curing concrete;
        at least one aperture extending through a side of the outer wall to enable humidity from the curing concrete to enter into the interior of the at least one sampling chamber; and
        a sample conduit that establishes communication between the at least one sampling chamber and the conduit.

2. The humidity monitor of claim 1, wherein the humidity monitor only includes one dew point temperature sensor.

3. The humidity monitor of claim 1, wherein the housing imparts the humidity monitor with portability.

4. The humidity monitor of claim 3, wherein a size of the housing enables the humidity monitor to be carried and positioned by an individual.

5. The humidity monitor of claim 1, further comprising:
    a manifold that can receive the moisture sample from any of a plurality of locations outside of the humidity monitor and communicate the moisture sample to the conduit.

6. The humidity monitor of claim 1, further comprising:
    a power supply for the vacuum pump and the dew point temperature sensor.

7. The humidity monitor of claim 1, further comprising:
    a processing element that:
        controls operation of the vacuum pump and the dew point temperature sensor;
        receives data from the dew point temperature sensor; and
        outputs or transmits the data from the dew point temperature sensor.

8. The humidity monitor of claim 7, wherein the processing element also:
    processes the data from the dew point temperature sensor.

9. The humidity monitor of claim 8, wherein the processing element processes the data from the dew point temperature sensor to provide an indicator of a quality of the curing of the concrete.

10. The humidity monitor of claim 7, further comprising at least one of:
    a memory device in communication with and under control of the processing element; and
    a communication element in communication with and under control of the processing element.

11. A humidity monitoring system, comprising:
    a humidity monitor including:
        a conduit that receives a moisture sample from outside the humidity monitor;
        a sampling tank in communication with the conduit;
        a vacuum pump that applies a vacuum to at least one of the conduit and the sampling tank;
        a dew point temperature sensor in communication with the sampling tank; and
        a processing element in communication with the vacuum pump and the dew point temperature sensor; and
    a sampling system including:
        at least one sampling chamber placeable within concrete, the at least one sampling chamber including an interior defined by a sidewall of the at least one sampling chamber and at least one aperture extending through the sidewall that enables moisture to be communicated from the concrete into the interior, a bottom end of the at least one sampling chamber having a rounded or tapered shape that facilitates insertion of the at least one sampling chamber into wet or curing concrete; and
        a sample conduit that establishes communication between the at least one sampling chamber and the conduit of the humidity monitor.

12. The humidity monitoring system of claim 11, wherein the sampling system further includes:
    a valve that controls flow communication between the at least one sampling chamber and the conduit of the humidity monitor.

13. The humidity monitoring system of claim 12, wherein the processing element controls operation of the vacuum pump, the valve, and the dew point temperature sensor.

14. The humidity monitoring system of claim 11, wherein the valve is positioned between the at least one sampling chamber and the sample conduit.

15. The humidity monitoring system of claim 11, further comprising:
    a seal in an opening at a top of the at least one sampling chamber.

16. The humidity monitoring system of claim 11, wherein the humidity monitor further includes a manifold in communication with the conduit and the sampling system includes a plurality of sampling chambers and a plurality of sample conduits in communication with the manifold.

17. A method for monitoring humidity of concrete, comprising:
    placing a rounded or tapered end of at least one sampling chamber in wet or curing concrete and pushing the at least one sampling chamber into the wet or curing concrete such that moisture from the wet or curing concrete can be communicated into an interior of the at least one sampling chamber through at least one aperture in a side of the at least one sampling chamber;

establishing communication between the at least one sampling chamber and a remotely located humidity monitor by way of a conduit extending between the at least one sampling chamber and the remotely located humidity monitor;

drawing a moisture sample from the interior of the at least one sampling chamber into a sampling tank of the remotely humidity monitor; and measuring a dew point temperature of the moisture sample.

18. The method of claim 17, wherein:

placing the at least one sampling chamber comprises placing a plurality of sampling chambers in the wet or curing concrete; and establishing communication between the at least one sampling chamber and the remotely located humidity monitor comprises establishing communication between the plurality of sampling chambers and the remotely located humidity monitor.

19. The method of claim 18, wherein drawing the moisture sample comprises selectively drawing the moisture sample from a selected sampling chamber of the plurality of sampling chambers.

20. The method of claim 17, further comprising:

using the dew point temperature measurement to determine an indicator of the quality of the curing process.

* * * * *